(12) United States Patent
Daeumer et al.

(10) Patent No.: US 9,614,370 B2
(45) Date of Patent: Apr. 4, 2017

(54) SURGE ARRESTER

(71) Applicant: EPCOS AG, Munich (DE)

(72) Inventors: Wolfgang Daeumer, Zeuthen (DE); Frank Werner, Berlin (DE); Eberhard Soelter, Berlin (DE)

(73) Assignee: EPCOS AG, Munich (DE)

( * ) Notice: Subject to any disclaimer, the term of this patent is extended or adjusted under 35 U.S.C. 154(b) by 102 days.

(21) Appl. No.: 14/391,694

(22) PCT Filed: Mar. 26, 2013

(86) PCT No.: PCT/EP2013/056429
§ 371 (c)(1),
(2) Date: Oct. 9, 2014

(87) PCT Pub. No.: WO2013/152948
PCT Pub. Date: Oct. 17, 2013

(65) Prior Publication Data
US 2015/0077894 A1 Mar. 19, 2015

(30) Foreign Application Priority Data
Apr. 12, 2012 (DE) .................. 10 2012 103 158

(51) Int. Cl.
| | |
|---|---|
| *H02G 13/00* | (2006.01) |
| *H02H 9/06* | (2006.01) |
| *H01T 1/20* | (2006.01) |
| *H01T 4/12* | (2006.01) |
| *H01B 3/12* | (2006.01) |
| *H02H 1/04* | (2006.01) |

(52) U.S. Cl.
CPC .................. *H02H 9/06* (2013.01); *H01B 3/12* (2013.01); *H01T 1/20* (2013.01); *H01T 4/12* (2013.01); *H02H 1/04* (2013.01)

(58) Field of Classification Search
CPC .......... H02G 13/00; H02G 13/80; H01C 7/12; H01T 4/12
USPC ......................................................... 361/117
See application file for complete search history.

(56) References Cited

U.S. PATENT DOCUMENTS

| | | | |
|---|---|---|---|
| 4,287,548 A | 9/1981 | Hahndorff | |
| 4,475,055 A | 10/1984 | Boettcher | |
| 4,578,733 A | 3/1986 | Shigemori et al. | |
| 4,680,665 A | 7/1987 | Bonnesen et al. | |

(Continued)

FOREIGN PATENT DOCUMENTS

| | | |
|---|---|---|
| DE | 6607772 U | 4/1971 |
| DE | 2834088 A1 | 2/1980 |

(Continued)

*Primary Examiner* — Dharti Patel
(74) *Attorney, Agent, or Firm* — McDermott Will & Emery LLP

(57) ABSTRACT

A surge arrester comprises an electrical insulator (10), which surrounds a cavity (20), a pin electrode (30) and a tube electrode (40), which are arranged in the cavity (20), wherein the pin electrode (30) projects into the tube electrode (40). An ignition strip (50) is applied on an inner surface (S10a) of the insulator facing the cavity (20). An outer metallization (61, 62, 63) is arranged on an outer surface (S10b) of the insulator (10). As a result, an effective reduction of the protection level can be achieved in the case of the surge arrester.

8 Claims, 4 Drawing Sheets

(56) References Cited

U.S. PATENT DOCUMENTS

Figure 1:
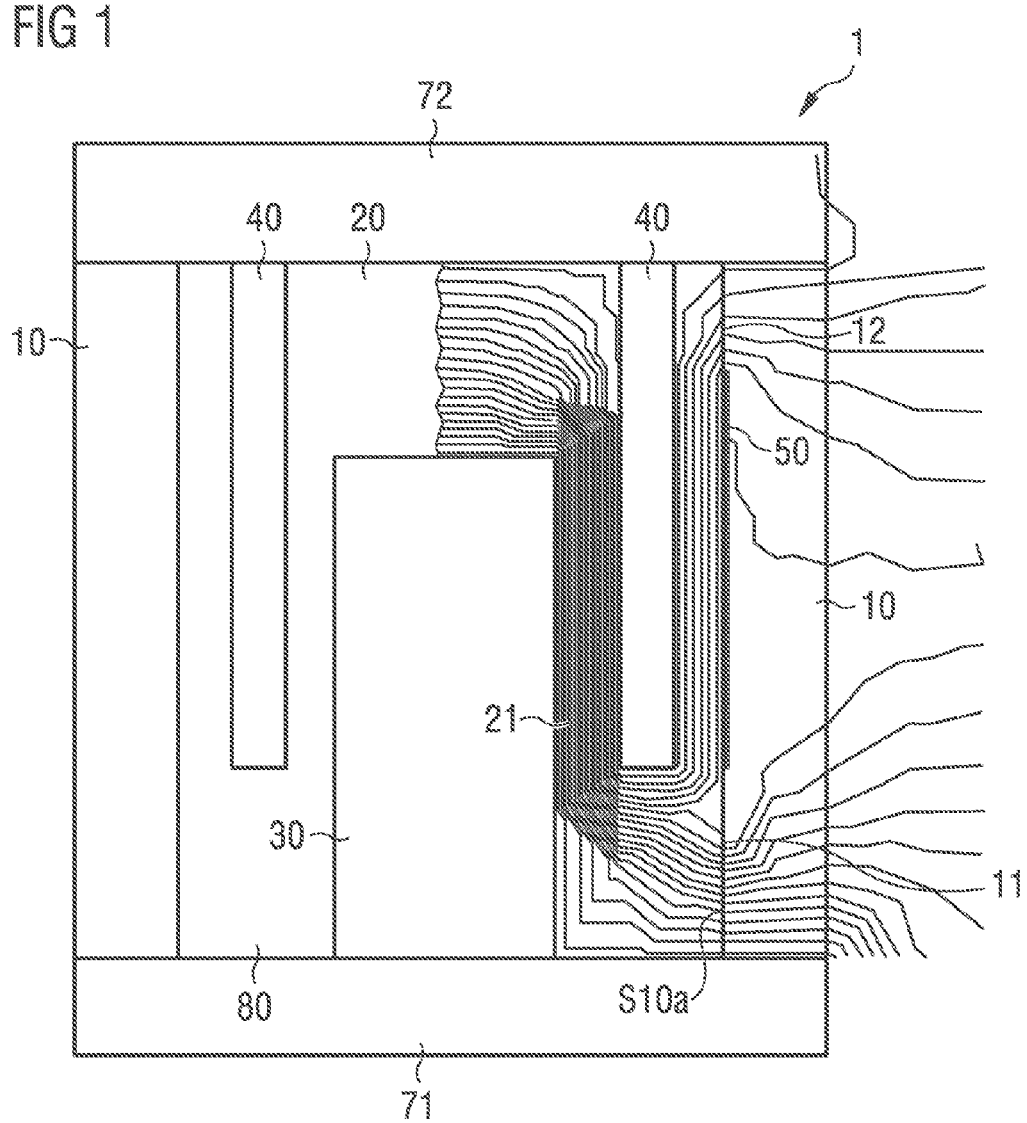

| | | | |
|---|---|---|---|
| 8,189,315 B2 * | 5/2012 | Boy | ............................ H01T 4/12 361/117 |
| 2008/0218082 A1 | 9/2008 | Boy et al. | |

FOREIGN PATENT DOCUMENTS

| | | |
|---|---|---|
| DE | 3042847 A1 | 6/1982 |
| DE | 3118137 A1 | 12/1982 |
| DE | 7823295 U1 | 3/1984 |
| DE | 19641385 A1 | 4/1997 |
| DE | 10253166 A1 | 5/2004 |
| DE | 102005036265 A1 | 2/2007 |
| DE | 102009006543 A1 | 8/2010 |
| EP | 0242688 A1 | 10/1987 |
| JP | S55024396 | 2/1980 |
| JP | S59108290 A | 6/1984 |
| JP | H02049387 | 2/1990 |
| JP | 2009503795 A | 1/2009 |
| WO | WO-2007014556 A1 | 2/2007 |

\* cited by examiner

SURGE ARRESTER

The invention relates to a surge arrester in which the response surge voltage is reduced.

Surge arresters can be used for protecting data lines against an overvoltage that would possibly damage a communication device connected to the data line. A further field of application in which surge arresters are used is power supply system protection. A surge arrester connected to a supply line of an AC power supply system serves, for example, to protect the supply line against an overvoltage in the event of a lightning strike.

In contrast to the protection of data lines, on which low currents flow, significantly higher currents of usually above 100 A and, compared with data lines, also significantly increased voltages, for example voltages of 110 V to 400 V AC, occur on supply lines in AC power supply systems. In the event of a voltage pulse occurring on the supply line owing to a flash of lightning, the surge arrester is intended to trigger, dissipate the overvoltage pulse toward ground and then shut off again.

Such arresters for supply lines of AC power supply systems have to comply with a so-called protection level. The standard specification DIN EN 61643-11 demands, for example, that the response voltage in the case of an applied voltage pulse of the form 1.2/50 μs with a maximum amplitude of 6 kV must not exceed a value of typically 1500 V, a minimum response voltage of 500 V being demanded at the same time. In this case, the voltage pulse of the form 1.2/50 μs is a DC voltage pulse which rises to 6 kV within 1.2 μs and decays to half the value within 50 μs.

Recently, there have increasingly been demands for a reduction of the protection level from said 1500 V, for example, to 1000 V, for example. Furthermore, it is demanded that despite the reduction of the protection level, other characteristic parameters of the arrester should be maintained. This means de facto a reduction of the response surge voltage while maintaining the response DC voltage of the arrester. By way of example, in the case of a surge arrester, although the response surge voltage should be reduced, at the same time, upon the occurrence of a slow voltage rise on the line, for example a voltage rise of 400 V within 5 ms, such as can occur during normal power supply system operation, the arrester should not be triggered before a response DC voltage of 600 V is attained.

There is a need to specify a surge arrester in which the response surge voltage is reduced while the response DC voltage of the arrester is maintained.

One embodiment of such a surge arrester is specified in patent claim 1.

The surge arrester comprises an electrical insulator, which surrounds a cavity, a pin electrode and a tube electrode, which are arranged in the cavity, wherein the pin electrode projects into the tube electrode. At least one ignition strip is applied on an inner surface of the insulator facing the cavity. Furthermore, an outer metallization is arranged on an outer surface of the insulator.

As a result of an outer metallization being applied on the insulator, for example an insulator composed of a ceramic material, in conjunction with a coaxial construction of the electrodes, it is possible to reduce the response surge voltage while maintaining the response DC voltage. Combination of outer metallic linings with a coaxial inner construction makes it possible to reduce the response surge voltage, for example to a protection level of 1000 V, while maintaining a response DC voltage of 600 V in the case of a voltage rise of 400 V per 5 ms. Field simulations show that, as a result of this combination in the case of the construction of the surge arrester, it is possible to attain particularly high field strengths in the interior of the arrester, in particular at the tip of the ignition strips, which leads to a reduction of the response surge voltage.

The outer metallization can be fitted for example in a ring-shaped fashion on the outer surface of the insulator. In the case of the ring-shaped arrangement of the outer metallization around the circumference of the arrester, the outer metallization has two sections. The sections are arranged in each case on the outer surface of the insulator and extend toward one another in each case in a manner proceeding from an edge of the outer surface of the insulator. The two edges of the outer surface of the insulator in this case face different connection electrodes of the surge arrester. The outer surface of the insulator can be connected at each of its edges to one of the connection electrodes of the surge arrester. One of the sections of the outer metallization layer can be electrically connected to the pin electrode and the other of the sections of the outer metallization layer can be in electrical contact with the tube electrode. A gap remains between the sections of the outer metallization, in approximately the center of the outer surface of the insulator, said gap being free of the material of the outer metallization and thus constituting an insulation clearance.

In another embodiment, the outer metallization on the surface of the insulator can extend on one side from one edge of the surface of the insulator, at which edge the insulator is connected to one connection electrode of the surge arrester, in the direction of the other edge of the outer surface of the insulator, said other edge being connected to the other connection electrode. The outer metallization extends for example from that edge of the outer surface of the insulator which faces the pin electrode in the direction of the opposite edge of the outer surface of the insulator, said opposite edge facing the tube electrode. The outer metallization is in electrical contact with the pin electrode and ends at a distance from that edge of the outer surface of the insulator which faces the tube electrode.

The invention is explained in greater detail below with reference to figures which show exemplary embodiments of the present invention.

Figure 2:
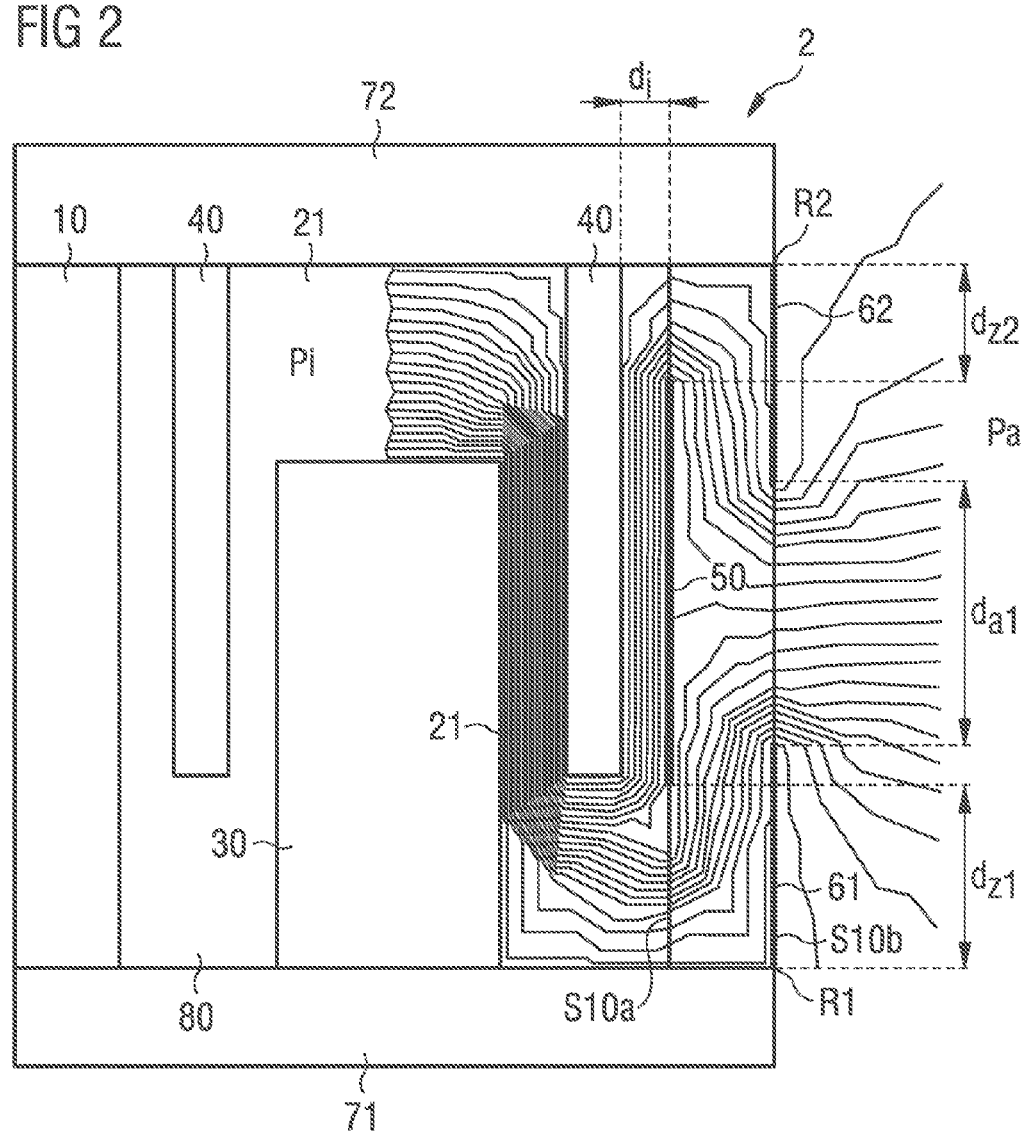
Figure 3:
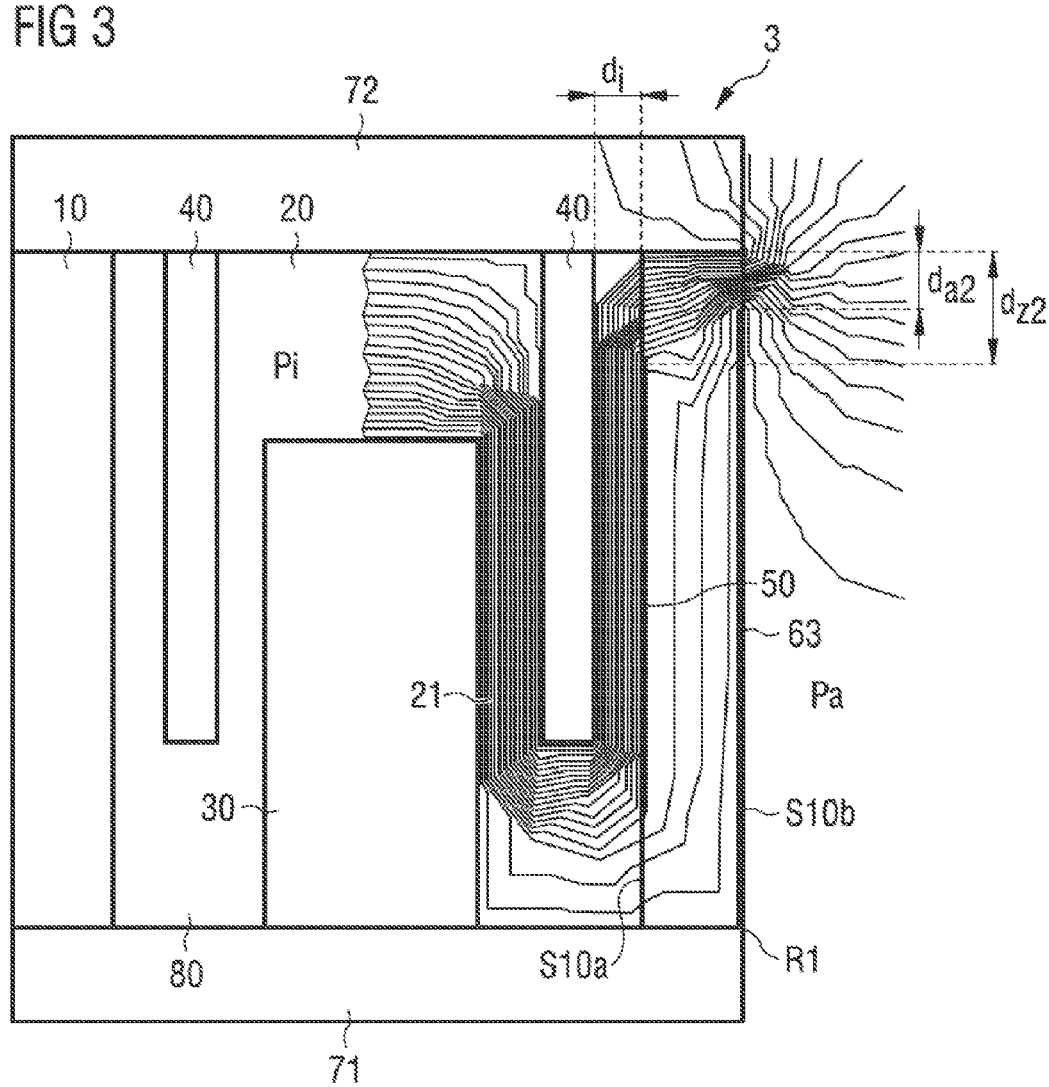
Figure 4:
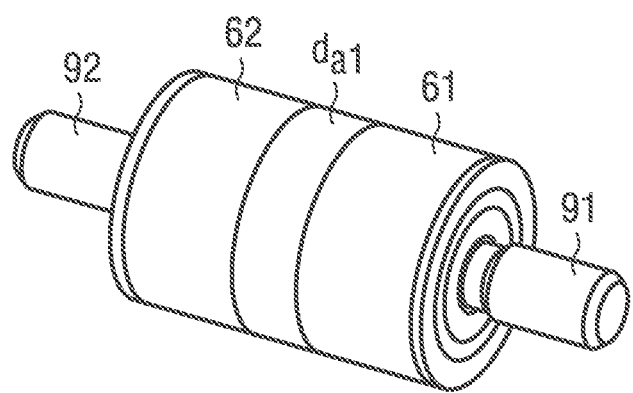

In the figures:

FIG. 1 shows one embodiment of a surge arrester without outer metallization with a field line distribution before the arrester is triggered, FIG. 2 shows one embodiment of a surge arrester with an outer metallization on two sides and with an associated field line distribution before the arrester is triggered, FIG. 3 shows one embodiment of a surge arrester with an outer metallization on one side and with an associated field line distribution before the arrester is triggered, FIG. 4 shows a perspective view of one embodiment of a surge arrester with an outer metallization on two sides.

FIG. 1 shows one embodiment 1 of an electrical component of a surge arrester having a coaxial construction of electrodes in the interior of the surge arrester. The surge arrester 1 comprises an electrical insulator 10, which surrounds a cavity 20. The insulator 10 can contain a ceramic material, for example a material of aluminum oxide. A pin electrode 30 and a tube electrode 40 are arranged in the cavity 20. The cavity 20 between the pin electrode 30, the tube electrode 40 and the electrical insulator 10 can be filled with a gas mixture containing, for example, an argon proportion of approximately 35% to 95%, a hydrogen proportion of 5% to 20% and a neon proportion of up to 50%.

The pin electrode 30 projects into the tube electrode 40 and is electrically connected to a connection electrode 71. The tube electrode 40 surrounds the pin electrode 30 and is electrically connected to a connection electrode 72. The tube electrode and the pin electrode are arranged in such a way that a gap 21 is formed between them, said gap forming a discharge space of the surge arrester. The pin electrode and the tube electrode can contain copper, iron or a tungsten-copper mixture. The connection electrodes 71, 72 can be produced from copper or Fe—Ni alloy.

One or a plurality of ignition strips 50 can be applied on an inner surface S10a of the insulator 10 facing the cavity 20. The ignition strip 50 can contain a material composed of graphite. Such an ignition strip makes it possible to ensure primarily a good dynamic ignition behavior of the arrester component. In the discharge case, a current flows from the connection electrode 71 to the pin electrode 30, via the spark gap of the discharge space 21 to the tube electrode 40 and from there to the connection electrode 72. In the discharge space 21, the surge current discharge takes place primarily radially.

FIG. 1 depicts the field lines that occur during the surge current discharge in the right-hand part of the surge arrester. For reasons of simplification, the field line profile is depicted only in the right-hand part of the surge arrester component. The field lines run correspondingly in the left-hand part of the surge arrester. The field lines indicate equipotential lines. The field lines run through the discharge space 21 of the cavity 20 between the pin electrode 30 and tube electrode 40 and in the part of the cavity 20 between the insulator 10 and the tube electrode 40. The field lines emerge into the outer surroundings of the component at residual insulation regions 11, 12 of the inner surface of the insulator which are not covered by the ignition strip 50.

In the case of the following embodiments 2 and 3 of the surge arrester, elements identical to those in FIG. 1 are designated by identical reference signs. Only the differences with respect to the embodiments 1 of the surge arrester as shown in FIG. 1 are discussed below. In the case of the embodiments 2 and 3 of the surge arrester, in contrast to the embodiment 1, an outer metallization is additionally arranged on an outer surface S10b of the insulator 10.

In the case of the embodiment 2 of the surge arrester as shown in FIG. 2, the outer metallization comprises a section 61 and a section 62, which are arranged at a distance $d_{a1}$ on the outer surface S10b of the insulator. The section 61 of the outer metallization is connected to the connection electrode 71 and the section 62 of the outer metallization is connected to the connection electrode 72. The section 61 of the outer metallization extends on the outer surface S10b of the insulator 10 in a manner proceeding from an edge R1 of the outer surface of the insulator, said edge facing the external electrode 71 or the pin electrode 30, in the direction of the section 62 of the outer metallization. The section 62 of the outer metallization extends on the outer surface S10b of the insulator 10 in a manner proceeding from an edge R2 of the outer surface of the insulator, said edge R2 being opposite the edge R1 and being connected to the external electrode 72 or facing the tube electrode 40, in the direction of the section 61 of the outer metallization. A gap is formed between the metallization layers 61 and 62.

The gap width or the distance $d_{a1}$ between the section 61 and the section 62 of the outer metallization is dependent on the internal main electrode distance $d_i$ and the filling gas pressure $p_i$ of the gas discharge gap 21. If $p_a$ denotes the external pressure of the surroundings of the insulator (usually 1 at) and $d_{a1,min}$ denotes the minimum distance of the metallization and 61, 62 in the gap region, the sections 61, 62 of the outer metallization can be arranged on the outer surface S10b of the insulator in such a way that the minimum distance between the metallizations results as $d_{a1,min}=P_i/P_a*d_i$.

In order to prevent possible creeping discharge effects of a discharge on the outer surface S10b of the insulator body 10, the outer distance $d_{a1}$ can be at least of the same magnitude as double the product of the distance $d_i$ between the pin electrode 30 and the tube electrode 40 and the quotient of the internal pressure $p_i$ of the filling gas 80 in the cavity 20 and the external atmospheric pressure $p_a$ of the surroundings of the surge arrester. Filling gases having a Paschen curve similar to that for air are assumed here. Consequently, the relationship $d_{a1}>2*p_i/p_a*d_i$ results or, for an external pressure of $p_a=1$ at, $d_{a1}$ preferably results as $d_{a1}>2*p_i*d_i$.

If the gas discharge gap becomes permeable, then the outer insulation clearance $d_{a1}$ should be larger than the main electrode gap $d_i$, since otherwise an outer discharge would occur instead of a discharge in the discharge space 21. Therefore, the distance $d_{a1}$ can be chosen as $d_{a1}>2*d_i$.

The ignition strip 50 can be arranged at a distance $d_{z1}$ away from the external electrode 71 and at a distance $d_{z2}$ away from the external electrode 72. The length of the section 61 of the outer metallization can be greater than the distance $d_{z1}$ of the ignition strip. The length of the section 62 of the outer metallization can be greater than the distance $d_{z2}$ of the ignition strip.

FIG. 3 shows an embodiment 3 of the surge arrester in which, as outer metallization, only one outer metallization layer 63 is arranged on the outer surface S10b of the insulator 10. The outer metallization 63 extends on the outer surface S10b of the insulator in a manner proceeding from the edge R1 of the outer surface of the insulator, said edge facing the connection electrode 71 or the pin electrode 30, in the direction of the opposite edge R2 of the outer surface of the insulator, said edge facing the connection electrode 72 or the tube electrode 40. The outer metallization layer 63 is connected to the external electrode 71 and is arranged at the distance $d_{a2}$ from the external electrode 72. The outer metallization 63 ends at a distance $d_{a2}$ away from the edge R2.

The ignition strip 50 is arranged at a distance $d_{z2}$ from the external electrode 72. The distance $d_{a2}$ between the outer metallization 63 and the external electrode 72, said distance corresponding to the residual insulation clearance between the outer metallization and the counter electrode 72, is shorter than the distance $d_{z2}$ between the ignition strip 50 and the external electrode 72.

Furthermore, the distance $d_{a2}$ between the outer metallization 63 and the external electrode 72 is at least of the same magnitude as double the product of the distance $d_i$ between the pin electrode 30 and the tube electrode 40 and the quotient of the internal pressure $p_i$ of the filling gas 80 situated in the cavity 20 and the external atmospheric pressure $p_a$ of the surroundings of the surge arrester.

In the case of the embodiment 3 of the surge arrester, the distance $d_{a2}$ between the outer metallization layer 63 and the external electrode 72 is dependent on the internal electrode distance $d_i$, the filling gas pressure $p_i$ of the gas discharge gap 21 and the external atmospheric pressure $p_a$.

The minimum distance $d_{a2,min}$ between the outer metallization 63 and the connection electrode 72 can be chosen as $d_{a2,min}=Pi/P_a*di$.

In order to prevent possible creeping discharge effects of a discharge on the outer surface S10b of the insulator 10, the distance $d_{a2}$ between the outer metallization 63 and the external electrode 72 should be double the product of the distance $d_i$ between the pin electrode 30 and the tube electrode 40 and the quotient of the internal pressure $p_i$ of the filling gas 80 in the cavity 20 and the external atmospheric pressure $p_a$ of the surroundings of the surge arrester. Filling gases having a Paschen curve similar to that for air are assumed here. Consequently, the relationship $d_{a2}>2*p_i/p_a*d_i$ results or, for an external pressure of $p_a =1$ at, $d_{a2}$ preferably results as $d_{a1}>2*p_i*d_i$.

If the gas discharge gap becomes permeable, then the outer insulation clearance $d_{a2}$ should be larger than the main electrode gap $d_i$, since otherwise an outer discharge would occur instead of a discharge in the discharge space 21. Therefore, the distance $d_{a2}$ can be chosen as $d_{a2}>2*d_i$.

Depending on the demanded voltage rises, the layer thickness of the outer metallizations 61, 62, 63 can be between 3 μm and 25 μm. However, a metal cap having a thickness in the millimeters range can also be pushed over the insulator 10.

As can be gathered from the field line distributions in FIGS. 2 and 3, the field lines are concentrated at the ends of the ignition strip 50 and the ends of the outer metallization, such that in these regions high field strengths are attained in the interior of the arrester, which lead to a reduction of the response surge voltage of the components. At the same time, the response DC voltage, for example a static ignition voltage of approximately 600 V, can be maintained by means of the embodiments 2 and 3 of the surge arrester.

FIG. 4 shows a perspective view of the surge arrester in accordance with the embodiment 2 shown in FIG. 2. The surge arrester comprises an insulator 10 arranged cylindrically around the cavity 20. The insulator 10 is connected at its edges to the external electrode 71 and the external electrode 72. The connection electrodes 71, 72 are connected to connection studs 91, 92. The outer metallization is arranged in a ring-shaped fashion on the outer surface S10b of the insulator. The two sections 61, 62 of the outer metallization are arranged in a manner spaced apart from one another by the distance $d_{a1}$.

LIST OF REFERENCE SIGNS 1, 2, 3 embodiments of the surge arrester
10 insulator
20 cavity
21 discharge space
30 pin electrode
40 tube electrode
50 ignition strip
61, 62, 63 outer metallization
71, 72 connection electrodes
80 filling gas
91, 92 connection studs

The invention claimed is:

1. A surge arrester, comprising:
an electrical insulator (10), which surrounds a cavity (20); and
a pin electrode (30) and a tube electrode (40), which are arranged in the cavity (20), wherein the pin electrode (30) projects into the tube electrode (40);
wherein at least one ignition strip (50) is applied on an inner surface (S10a) of the insulator facing the cavity (20),
wherein an outer metallization (61, 62, 63) is arranged on an outer surface (S10b) the insulator (10), and
wherein either:
the outer metallization comprises a first section (61) and a second section (62), which are arranged in a manner spaced apart at a distance ($d_{a1}$) from one another on the outer surface (S10b) of the insulator (10), or
a first connection electrode (71) is connected to the pin electrode (30) for the purpose of applying a voltage potential, a second connection electrode (72) is connected to the tube electrode (40) for the purpose of applying a voltage potential, the outer metallization (63), proceeding from a first edge (R1) of the outer surface (S10b) of the insulator (10), said first edge being closer to the first connection electrode (71) than to the second connection electrode (72), extends in the direction of a second edge (R2) of the outer surface (S10b) of the insulator, said second edge being opposite the first edge (R1), and is arranged at a distance ($d_{a2}$) from the second edge (R2), wherein the ignition strip (50) is arranged at a distance ($d_{z2}$) from the second connection electrode (72), and wherein the distance ($d_{a2}$) between the outer metallization (63) and the second connection electrode (72) is shorter than a distance ($d_{z1}$) of the ignition strip (50) from the first connection electrode (71).

2. The surge arrester according to claim 1,
wherein the insulator (10) is arranged cylindrically around the cavity (20),
wherein the outer metallization (61, 62, 63) is arranged in a ring-shaped fashion on the outer surface (S10b) of the insulator (10).

3. The surge arrester according to claim 1, wherein the first section (61) of the outer metallization on the outer surface (S10b) of the insulator (10), proceeding from a first edge (R1) of the outer surface of the insulator, said first edge facing the first connection electrode (71), and the second section (62) of the outer metallization on the outer surface (S10b) of the insulator (10), proceeding from a second edge (R2) of the outer surface of the insulator, said second edge being arranged opposite the first edge (R1), extend toward one another.

4. The surge arrester according to claim 1,
wherein the ignition strip (50) is arranged at a first distance (dz1) from the first connection electrode (71),
wherein the length of the first section (61) of the outer metallization is greater than the first distance (dz1) of the ignition strip (50),
wherein the ignition strip (50) is arranged at a second distance (dz2) from the second connection electrode (72),
wherein the length of the second section (62) of the outer metallization is greater than the second distance (dz2) of the ignition strip (50).

5. The surge arrester according to claim 1, wherein the distance (da1) between the first and second sections (61, 62) of the outer metallization is at least of the same magnitude as double the product of the distance (di) between the pin electrode (30) and the tube electrode (40) and the quotient of the internal pressure (pi) of a filling gas in the cavity (20) and the external atmospheric pressure (pa) of the surroundings of the surge arrester.

6. The surge arrester according to claim 1, wherein the first section (61) of the outer metallization is connected to the first connection electrode (71) and the second section (62) of the outer metallization is connected to the second connection electrode (72).

7. The surge arrester according to claim 1, wherein the outer metallization (63) is connected to the first connection electrode (71) and is arranged in a manner spaced apart from the second connection electrode (72) by the distance (da2).

8. The surge arrester according to claim 1, wherein the distance (da2) between the outer metallization (63) and the second connection electrode (72) is at least of the same magnitude as double the product of the distance (di) between the pin electrode (30) and the tube electrode (40) and the quotient of the internal pressure (pi) of a filling gas (80) in the cavity (20) and the external atmospheric pressure (pa) of the surroundings of the surge arrester.

* * * * *